United States Patent
Lockery et al.

(10) Patent No.: US 6,910,392 B2
(45) Date of Patent: Jun. 28, 2005

(54) BENDING BEAM LOAD CELL WITH TORQUE SENSITIVITY COMPENSATION

(75) Inventors: Harry E. Lockery, Sudbury, MA (US); Robert L. Gray, Wayland, MA (US)

(73) Assignee: The Flintec Group, Ltd., Wan Chai (HK)

( * ) Notice: Subject to any disclaimer, the term of this patent is extended or adjusted under 35 U.S.C. 154(b) by 0 days.

(21) Appl. No.: 10/368,347

(22) Filed: Feb. 20, 2003

(65) Prior Publication Data

US 2004/0163481 A1 Aug. 26, 2004

(51) Int. Cl.[7] .................................. G01L 1/04
(52) U.S. Cl. ...................... 73/862.627; 73/862.632
(58) Field of Search ............... 73/862.627–862.635, 73/772–774, 862.65, 862.04

(56) References Cited

U.S. PATENT DOCUMENTS

| | | | | |
|---|---|---|---|---|
| 2,771,579 A | * | 11/1956 | Ruge | ........................... 73/765 |
| 3,576,128 A | * | 4/1971 | Lockery | ............... 73/862.633 |
| 3,707,076 A | * | 12/1972 | Jones | .................... 73/862.629 |
| 3,853,001 A | * | 12/1974 | Mock | .................... 73/862.631 |
| 4,380,175 A | | 4/1983 | Griffen | |
| 4,453,422 A | * | 6/1984 | Yorgiadis | ............... 73/862.632 |
| 4,453,609 A | | 6/1984 | Griffen et al. | |
| 4,556,115 A | | 12/1985 | Lockery et al. | |
| 4,565,255 A | | 1/1986 | Sarrazin | |
| 4,804,053 A | * | 2/1989 | Nordstrom | ................... 177/211 |
| 4,958,526 A | | 9/1990 | Haggstrom | |
| 4,979,580 A | * | 12/1990 | Lockery | ..................... 177/211 |
| 4,996,882 A | * | 3/1991 | Kistler | ................. 73/862.632 |
| 5,386,724 A | * | 2/1995 | Das et al. | ..................... 73/767 |
| 5,610,343 A | | 3/1997 | Eger et al. | |
| 5,962,792 A | * | 10/1999 | Kimerer, Jr. | ........... 73/862.632 |
| 6,147,312 A | | 11/2000 | Lockery | |
| 6,173,615 B1 | | 1/2001 | Takahashi | |
| 6,253,627 B1 | * | 7/2001 | Lee et al. | ............. 73/862.627 |
| 6,601,455 B2 | * | 8/2003 | Kurtz et al. | .................. 73/774 |

* cited by examiner

Primary Examiner—Max Noori
Assistant Examiner—Alandra Ellington

(57) ABSTRACT

A bending beam load cell can be compensated for side-to-side off center load sensitivity by simple electrical adjustments if a pair of shear sensing strain gages are bonded to each bending beam midway between axial strain gages used to measure bending strains. The shear sensing strain gages measure torque on the load cell, and are incorporated in bridge circuits that make it possible to vary the amount of torque sensitivity correction by changing the value of a trimming resistor. The bridge circuits also include circuit components for compensation of front-to-back off center load error and for zero adjustment. Four strain gages on each bending beam can be part of a single composite strain gage element, so the shear sensing strain gages do not add any cost to the load cell. Such a load cell can also be hermetically sealed before any compensation of offset load errors is done.

15 Claims, 5 Drawing Sheets

BENDING BEAM LOAD CELL WITH TORQUE SENSITIVITY COMPENSATION

BACKGROUND OF THE INVENTION

1. Field of the Invention

The present invention relates to strain gage load cells, and more particularly to bending beam load cells with means for eliminating errors caused by off center loading on the bending beam load cells.

2. Description of the Related Art

Bending beam load cells have been extensively used for weighing since about 1950. A common design is the Single Point Load Cell, which comprises two parallel bending beams on top of each other, separated by rigid end blocks. The load cell is cantilevered from a base supporting one end block, and the other end block supporting a load platform. Axially oriented strain gages are bonded to each beam near the joints with the end blocks.

When a load acts on the load platform, the rigid end pieces force the two bending beams to flex into flat S-shapes. One strain gage on each bending beam will accordingly sense tension, while the second strain gage will sense compression. The four strain gages are connected in a bridge circuit to provide an output signal used to measure the load.

If the symmetry of a single point load cell were perfect, the output signal from the bridge circuit would be a true measure of the vertical component of the load, independent of the position and direction of the load on the load platform. In practice, there are small differences in the strain sensitivity of the four strain gages, and small mechanical differences in the bending beams, as well as errors in the position of the gages on the bending beams. These errors upset the symmetry of the load cell, so there will be errors in the output signal caused by movement of the load application point, both along the load cell axis ("Front-to-back off center load error"), and crosswise to the load cell axis ("Side-to-side off center load error"). The latter off center load error is also known as torque sensitivity, because side to side off center loading subjects the load cell to torque.

From the earliest use of single point load cells it has been known that both of these errors can be minimized by careful filing of the bending beams near the strain gages. The filing requires great skill, and it is time consuming, but it is still the most used method for compensation of off center load errors in single point load cells.

A serious disadvantage with filing of the bending beams to compensate for torque sensitivity is that it makes it impossible to seal the load cell. A sealing bellows can be made soft in the bending direction, but it will always be stiff against torque, so it will have a substantial effect on the torque sensitivity of the sealed load cell. Filing, however, can not be done after the bellows is in place.

U.S. Pat. No. 3,576,128 to Lockery describes an effective method for electrical compensation of the front-to-back off center load error, but it is not applicable to compensation of torque sensitivity.

U.S. Pat. No. 4,453,609 to Griffin et al describes methods for electrical compensation of side-to-side off center load error for a single point load cell. The Griffin methods require either two pairs of axially oriented strain gages placed on opposite sides of the center line of each bending beam, or alternatively two strain gages mounted on the centerline of each bending beam, but with off-axis orientations. The compensation procedure described in the referenced patent is very complicated. It has not been sucessfully used commercially.

U.S. Pat. No. 5,610,343 to Eger et al describes methods for electrical compensation of both types of off center load errors in a bending beam load cell with multiple axially oriented strain gages on each bending beam. Microprocessor sampling of different pairs of strain gage signals in a bridge circuit is used to calculate off center loading errors, and error corrected signals are calculated at frequent intervals. This method is quite complicated, and requires nonstandard electronic instruments for display of load signals. It has not been successfully used commercially.

SUMMARY OF THE INVENTION

An aspect of the present invention is to provide a bending beam load cell that can be compensated for torque sensitivity by purely electrical means.

Another aspect of the present invention is to provide a bending beam load cell that can be hermetically sealed before front-to-back and side-to-side off center load errors are compensated.

Aspects of the invention are obtained by a bending beam load cell which comprises tension and compression sensing strain gages connected in a bridge circuit providing an output signal proportional to a load on the bending beam, shear sensing strain gages sensing torque in the load cell, and means for combining signals from the torque sensing strain gages with the output signal to compensate for torque sensitivity in the output signal.

Additional aspects and advantages of the invention will be set forth in part in the description which follows, and, in part, will be obvious from the description, or may be learned by practice of the invention. The aspects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF PREFERRED EMBODIMENTS

Figure 1:
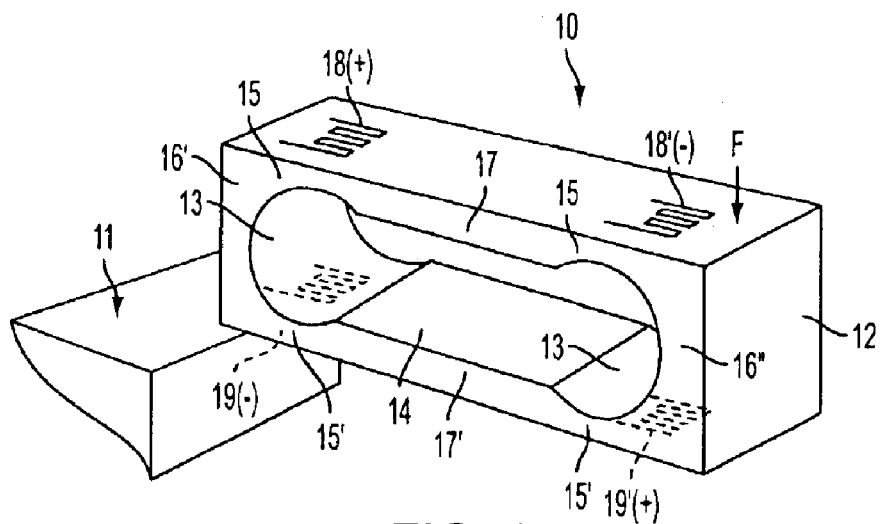
FIG. 1 is a simplified perspective view of a prior art single point load cell.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
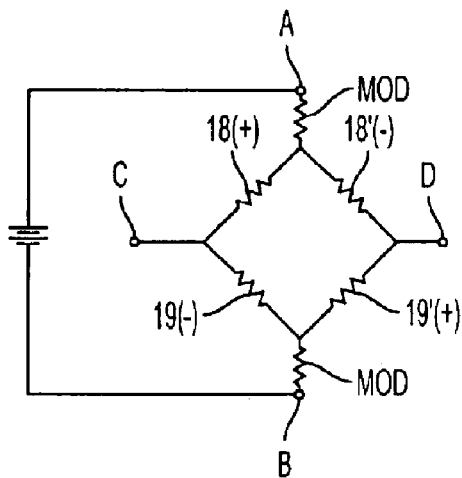
FIG. 2 is a schematic view of a strain gage bridge used with a single point load cell as shown in FIG. 1.

Compensation for torque sensitivity according to embodiments of the invention is best understood by comparison with a prior art load cell, which is shown in FIGS. 1 and 2.

FIG. 1 is a simplified perspective view of a single point load cell 10, which is cantilevered from a base 11. The load cell is made from a block 12 of load cell quality metal alloy. Two transverse cylindrical cutouts 13 are joined by a longitudinal slot 14 to form a pair of bending beams 17, 17' held in fixed parallel relationship by end blocks 16' and 16". The cylindrical cutouts 13 form a pair of thin flexures 15 and 15' between the bending beams 17, 17' and the end blocks 16', 16". One end block 16' is mounted on the base 11, and the other end block 16" acts as support for a load platform (not shown). Pairs of axially oriented strain gages 18, 18' and 19, 19' are bonded on each bending beam at the flexures 15 and 15'. When a vertical load F acts on the free end block 16" the load cell deflects slightly, and the bending beams are forced to assume flat S-shapes. One strain gage on each bending beam thus will sense tension, while the other strain gage will sense compression, as indicated by suffixes (+) and (−) on the strain gage references.

The four strain gages 18, 18', 19, 19' are connected in a bridge circuit as shown in FIG. 2. One bridge diagonal with terminals A–B is connected to a voltage source or a power supply, and the other bridge diagonal with terminals C–D provides an output signal proportional to the load F. A pair of modulus gages (MOD) is connected between the voltage source and the associated bridge diagonal, as shown. The modulus gages are bonded to the bending beams (not shown in FIG. 1) to sense the temperature of the load cell 10 and correct errors caused by temperature sensitivity in the gage factor for the strain gages 18, 18', 19, 19' and in the modulus of elasticity for the bending beams 15, 15', as is well known in the art.

If the load cell 10 were perfectly symmetrical, the output signal at terminals C–D would be insensitive to displacement of the load F on the load platform in a direction perpendicular to the longitudinal axis of the load cell. In practice there will be unavoidable errors in the symmetry, caused by mechanical tolerances and placement tolerances of the strain gages 18, 18' 19, 19', so the output signal will show so called side-to-side off center load error. The only practical method for compensating for this error has up to now been by filing of the bending beam flexures 15, 15' to restore symmetry.

Figure 3:
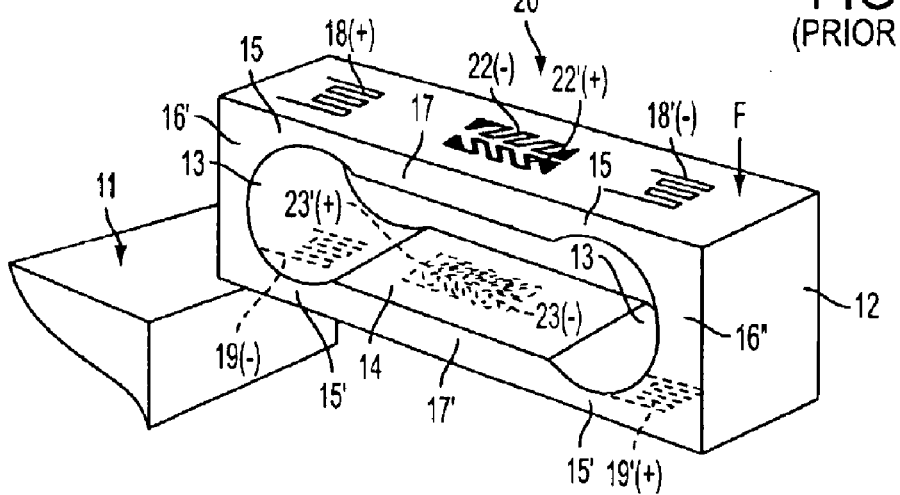
FIG. 3 is a simplified perspective view of a single point load cell according to an embodiment of the invention.

FIG. 3 is a simplified perspective view of a load cell 20 according to an embodiment of the invention. This load cell 20 is identical to the load cell 10 shown in FIG. 1, except that two pairs of shear sensing strain gages 22, 22' and 23, 23' have been added at the centers of the bending beams 17 and 17'. The strain gages 22, 22', 23, 23' are arranged at 45° to the longitudinal axis of the load cell 20, so they measure the principal strains caused by torque on the load cell 20. A negative torque, caused by a load centered to the left of the load cell axis as seen from the free end (end block 16") of the load cell 20, will cause reduced resistance in the shear sensing strain gages 22 and 23, and increased resistance in strain gages 22' and 23', as indicated by (+) and (−) suffixes on the strain gage references in FIGS. 3, 4, 5, 6.

By combining signals from the shear sensing strain gages 22, 22', 23, 23', which sense torque on the load cell 20, with signals from the strain gages 18, 18', 19, 19', which sense bending stress contaminated by spurious torque stress, it is possible to obtain an output signal unaffected by side-to-side off center load sensitivity in the load cell 20.

Figure 4:
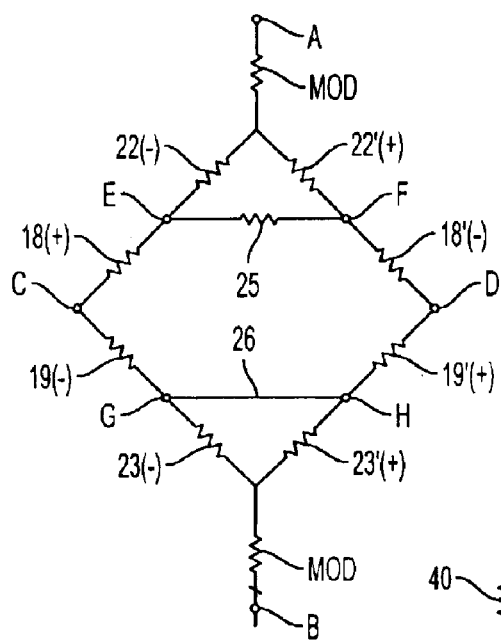
FIG. 4 is a schematic view for a strain gage bridge for a load cell according to an embodiment of the invention.

FIG. 4 is a schematic view of a preferred form of a strain gage bridge for a load cell according to an embodiment of the invention. Each arm of the bridge contains one strain gage 18, 18', 19, 19' sensing bending strain in series with one strain gage 22, 22', 23, 23' sensing shear strain. The shear sensing strain gages 22, 22', 23, 23' are arranged to form half bridges at the top and bottom of the strain gage bridge. A trimming resistor 25 is connected as a shunt across one of the shear sensing half bridges (22, 22') at terminals E–F, and the other shear sensing half bridge (23, 23') with terminals G–H is short circuited. By varying the resistance of the trimming resistor 25, a variable voltage from the shear sensing half bridge 22, 22' is combined with signal from the load sensing strain gages 18, 18', 19, 19'. A negative torque makes the normally negative output terminal C more positive, thus compensating for a side-to-side off center load error increasing with negative torque. If the problem is positive torque sensitivity, so a correction signal with opposite polarity is required, the location of short circuit 26 and the trimming resistor 25 should be interchanged, as those skilled in the art can see from the (+) and (−) markings in FIG. 4, as well as FIGS. 5 and 6.

Compensating for side-to-side off center load error in a load cell according to FIG. 3 with a strain gage bridge according to FIG. 4 is fast and straightforward. First, both of the shear sensing half bridges 22, 22' and 23, 23' are short circuited, while a constant load F is moved transversely to the axis of the load cell. The polarity of the error in the load reading relative to the direction of movement of the load application point determines which of the two shear sensing half bridges 22, 22' or 23, 23' should be active. The short circuit for this half bridge is replaced by a variable resistor 25 or 26, which is varied until the torque sensitivity is reduced to substantially zero. The variable resistor 25 or 26 is then replaced by a fixed resistor of the same value. Changes in the resistance of the trimming resistor 25 or 26 has negligible effect on the sensitivity of the load sensing part of the bridge.

The compensation can also be automated by feeding the side-to-side off center load error at one point for one load F to a computer programmed with the resistance values for all the strain gages and resistors in the bridge. The computer can then immediately indicate the proper location and resistance for the trimming resistor 25 or 26. A suitable resistance for each of the shear sensing gages 22, 22', 23, 23' is 7 ohm when the resistance in each of the four main strain gages 18, 18', 19, 19' is 350 ohm.

Figure 5:
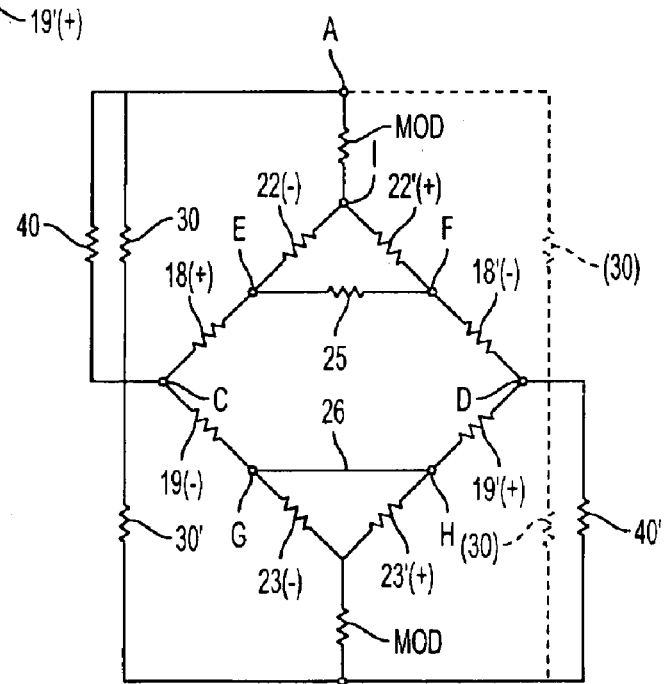
FIG. 5 is a schematic view of a strain gage bridge as shown in FIG. 4, with circuit elements added for compensation of front-to-back off center load sensitivity and zero adjustment.

The electrical torque sensitivity compensation according to embodiments of the invention can be combined with known methods for electrical compensation of front-to-back off center load error. FIG. 5 is a schematic view of a preferred strain gage bridge circuit for this purpose. The strain gage bridge circuit of FIG. 5 is based on a strain gage bridge as shown in FIG. 4, but trimming resistors 30, 30' for compensation of front-to-back off center load error have been added. This method for compensating front-to-back off center load sensitivity is described in U.S. Pat. No. 3,576, 128, the contents of which is included herein by reference. The left or the right half of the bridge is shunted by two equal resistors 30, 30' to compensate for front-to-back off center load sensitivity. The value and the location of the shunting resistors 30, 30' is determined by a simple calibration procedure. The resistors 30, 30' have negligible effect on the torque sensitivity compensation by means of shunt resistor 25, so the side-to-side off center load compensation is substantially independent of the front-to-back off center load compensation.

FIG. 5 also Includes a pair of zero adjustment resistors 40, 40' connected between the power supply terminals A and B and the bridge output terminals C and D. This method for zero adjustment is described in U.S. Pat. No. 4,958,526, which is included herein by reference. By using a pair of equal resistors 40, 40' connected as shown for zero adjustment, the zero adjustment will have no effect on the off center load compensation described above. Compensation for torque sensitivity by resistor 25, compensation for front-to-back off center load error by resistors 30, 30', and zero adjustment by resistors 40, 40' are substantially independent, so the three adjustments require no iterations, and can easily be automated.

Figure 6:
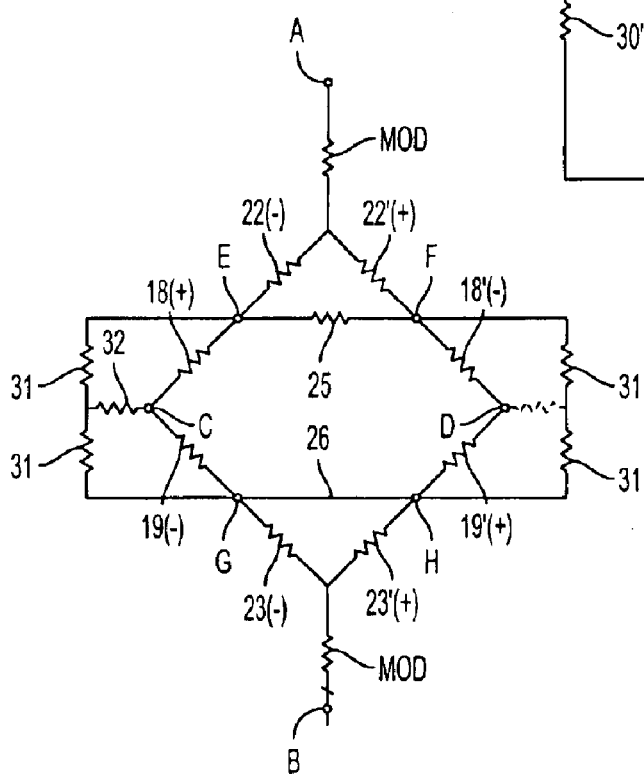
FIG. 6 is a schematic view of a strain gage bridge as shown in FIG. 4, with alternative circuit elements added for compensation of front-to-back off center load sensitivity.

FIG. 6 is a schematic view of another type of strain gage bridge for compensation of both torque sensitivity and front-to-back off center load sensitivity. A strain gage bridge as shown in FIG. 4 is complemented with two pairs of equal fixed resistors 31 connected across pairs of bending strain sensing strain gages 18, 18', 19, 19'. A trimming resistor 32 is connected between one bridge diagonal and the junction point between the two fixed resistors 31 in one pair. This method for compensation for front-to-back off center load sensitivity is described in U.S. Pat. No. 6,147,312, the contents of which is included herein by reference.

The polarity of the front-to-back off center load error compensation is determined by which of the bridge corner B or C is connected to the trimming resistor 32, and the resistance of the trimming resistor 32 determines the amount of front-to-back load off center load error compensation. This method for front-to-back off center load error compensation is essentially equivalent to the compensation method described with reference to FIG. 5. It has the advantage that the load on the bridge is constant at all settings of the trimming resistor 32, and that only one resistor 32 is varied, instead of a pair of resistors 30, 30'. Zero adjustment is not shown in FIG. 6, but can be made exactly as described above with reference to FIG. 5.

Figure 7:
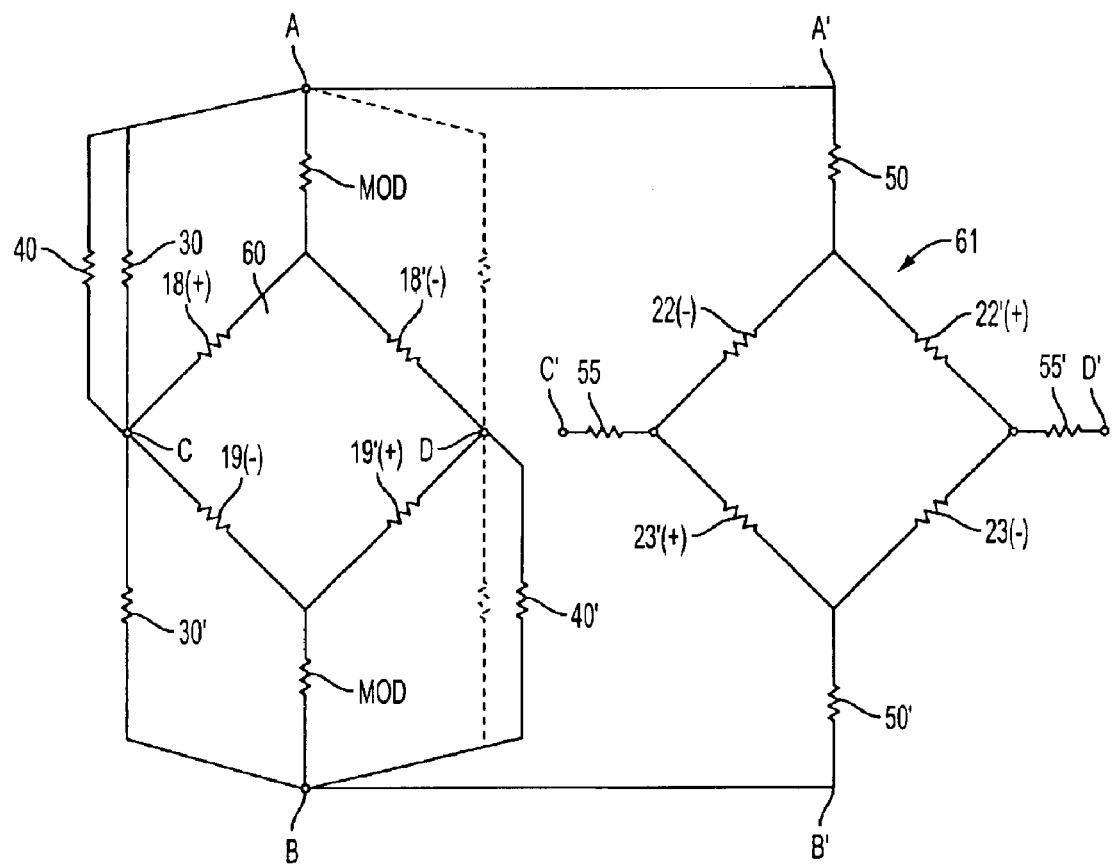
FIG. 7 is a schematic view of a basic strain gage bridge with circuit elements added for compensation of front-to-back off center load sensitivity, plus alternative circuit elements for torque sensitivity compensation according to an embodiment of the invention.

FIG. 7 is a schematic view of a basic strain gage using circuit elements in a further method for combining the weight signal with the torque compensation signal. In this case the weight signal, with compensation for front-to-back off center load sensitivity and zero adjustment, is developed in a main strain gage bridge 60 comprising the axially oriented strain gages 18, 18', 19, 19'. A signal proportional to the torque on the load cell is developed in a separate bridge 61 comprising the shear sensing strain gages 22, 22', 23, 23', which in this case may be 350 ohm gages. The output signals from the two bridges 60, 61 can be combined by connecting the output terminals C–D and C'–D' for the two bridges 60, 61 in parallel, as is well known in the art.

The polarity of the torque sensitivity compensation can be reversed by connecting terminal D' to terminal C and terminal C' to terminal D. The amount of torque sensitivity correction can be changed by a pair of resistors 55 and 55' between the signal diagonal and the output terminals C' and D' in the torque sensing bridge 61, or by a pair of resistors 50, 50' in series with the power supply terminals Compensation for front-to-back off center load sensitivity is determined by resistors 30, 30', and zero adjustment is determined by resistors 40, 40, as explained above with reference to FIG. 5. The three compensations are fully independent when using the circuit shown in FIG. 7.

Figure 8:
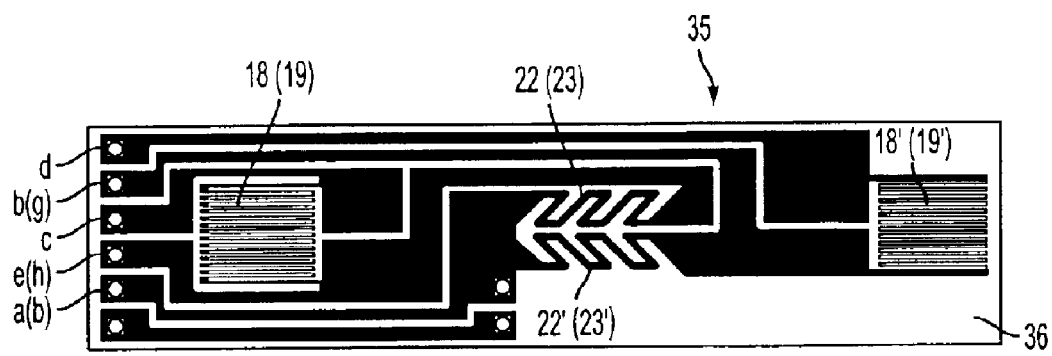
FIG. 8 is a plan view of a composite strain gage element for a single point load cell according to an embodiment of the invention.

FIG. 8 is a plain view of a composite strain gage 35 suitable for use in a load cell according to an embodiment of the invention. The composite strain gage 35 contains both the axial strain gages 18, 18' (19, 19') and the shear sensing strain gages 22, 22' (23, 23'), as well as all interconnections required in an upper or lower half of the bridge shown in FIG. 4, 5 or 6. Lower case references to the terminals on the left side of the composite strain gage 35 in FIG. 8 indicate which of the bridge terminals A–H these terminals will be connected to. The composite strain gage 35 has been made by etching a pattern in a metal foil on a plastic film 36, as is well known in the art. The cost for a composite strain gage 35 is accordingly the same whether a pair of shear sensing strain gages 22, 22' (23, 23') are included or not.

A composite strain gage element 35 can be bonded to each bending beam 17, 17' as one unit. This is less time consuming than bonding of four separate strain gages, and the relative positioning of individual gages is more accurate. Soldering of interconnections between individual strain gages after bonding to the bending beams is also eliminated. Composite strain gage elements 35 can be used with any of the circuit diagrams shown in FIGS. 4, 5 or 6.

Figure 9:
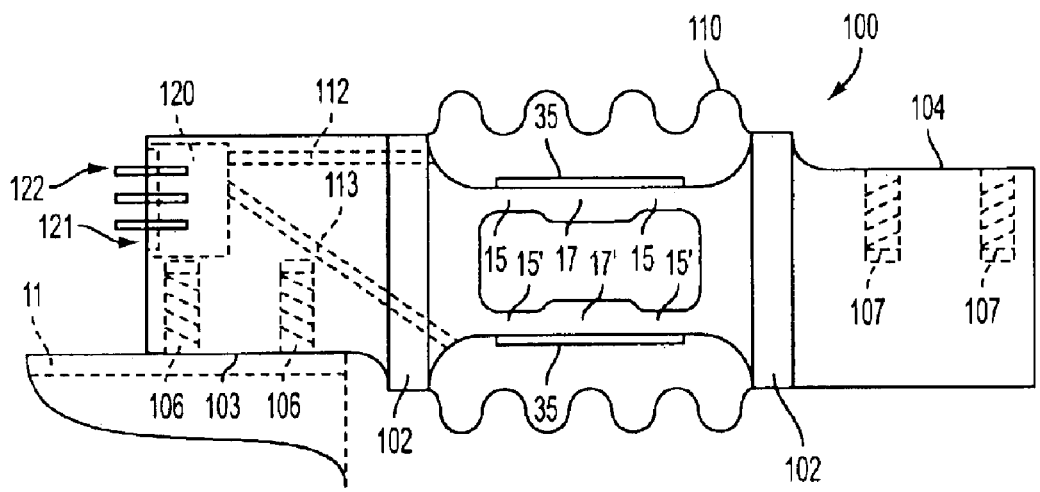
FIG. 9 is a simplified side view of a hermetically sealed single point load cell according to an embodiment of the invention.
Figure 10:
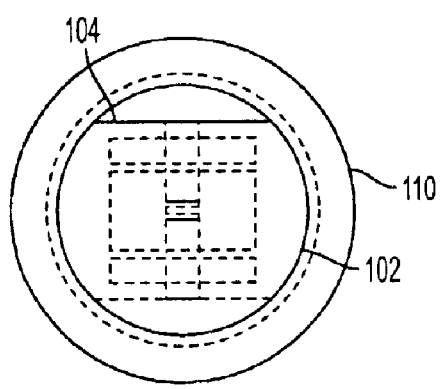
FIG. 10 is an end view from the right of the load cell shown in FIG. 9.

FIG. 9 is a side view of a hermetically sealed single point load cell 100 according to an embodiment of the invention. FIG. 10 is an end view from the right of the same load cell shown in FIG. 10.

The load cell 100 is milled from a cylindrical bar 102. A pair of flat horizontal surfaces 103 and 104 are milled near the ends of the bar 102. The lower flat surface 103 has a pair of threaded bottom holes 106 for mounting bolts so it can support the load cell 100 in cantilever fashion from the base 11. The upper flat surface 104 also has a pair of threaded bottom holes 107, and is adapted to support a load platform (not shown).

The sensing part of the load cell comprises two parallel bending beams 17, 17' with flexures 15, 15', as shown in FIGS. 1 and 3. Composite strain gage elements 35 as shown in FIG. 8 are bonded on top of bending beam 15 and at the bottom of bending beam 15' as indicated in FIG. 9. The terminal part on the left side of each composite strain gage 35 is oriented next to the fixed end (16') of the load cell on both the upper and lower bending beams 17, 17'. Space 120 for a glass to metal seal 121 with terminal pins 122 is milled at the stationary left end of the load cell 100. Conduits 112 and 113 for connecting wires from the strain gage elements 35 are drilled from the space 120 to the strain gage elements 35. After wires from the strain gage elements 35 are connected to pins 122 in the glass to metal seal 121, this seal is welded to the end surface of the load cell 100. A bellows 110 of thin stainless steel is threaded over the load cell 100 until the circular end sections of the bellows 110 fit over the cylindrical areas 102 on the load cell 100, and then welded to the load cell 100 to form a hermetic seal for the strain gages. Sealing bellows 110 is shown in upper and lower outline only, to avoid cluttering the drawing. Finally, the load cell is tested, and trimming resistors for calibration, side-to-side and front-to-back off center load sensitivity compensation, and zero adjustment, are soldered to the terminal pins 122 outside the glass to metal seal 121 before cables and a cable enclosure is added to the support end of the load cell 100.

The bellows 110 is soft in bending, but it is stiff against torque. It will accordingly have a substantial effect on the torque sensitivity of the load cell. This makes it impossible to seal a load cell after torque sensitivity is compensated by filing of the bending beams, but it is not important for a load cell according to embodiments of the invention, where compensation for torque sensitivity can be done electrically after the load cell 100 is sealed.

FIGS. 5 and 6 show that two terminals A–B are needed for power supply to the bridge, and two more terminals C–D are needed for the bridge output signal. The resistors 25, 26 used for torque sensitivity compensation in the circuits require two additional pairs of terminals E–F and G–H. All trimming resistors 25, 26, 30, 30' or 31, 32 and 40, 40' are connected to the terminals A–H, so only eight terminal pins 122 are needed in the glass to metal seal 121 to enable full compensation by means of external trimming resistors for all types of off center load errors after the load cell is fully sealed.

When a bridge circuit as shown in FIG. 5 is used, the number of terminals pins 122 can be reduced by two if a quick determination of the polarity of the side-to-side off center load error is made before the load cell 100 is sealed. When the polarity is known, it will be known which pair of terminals E–F or G–H should be short circuited. This short circuit 26 can be made before the load cell 100 is sealed, and only the terminals for the variable resistor 25 need to be connected to terminal pins 122.

The circuit shown in FIG. 7 requires six terminals accessible outside the hermetic seal.

Figure 11:
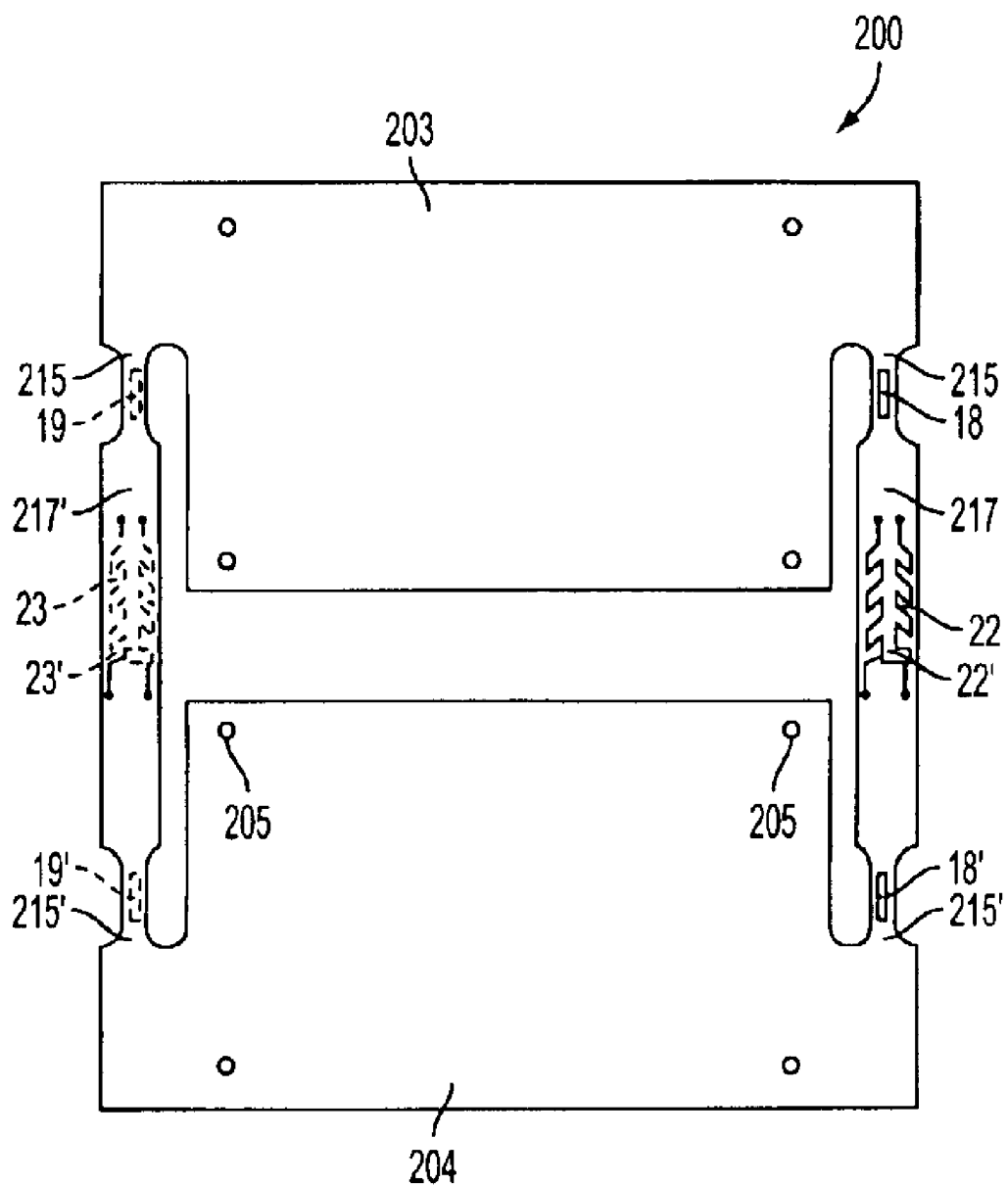
FIG. 11 is a top plan view of a planar gage bending beam load cell according to an embodiment of the invention.

FIG. 11 is a top plan view of a parallel bending beam load cell 200 according to another embodiment of the invention. The load cell is a planar gage load cell, made from a sheet of metal, with cutouts to form a mounting plate 203, a loading plate 204, and two bending beams 217 and 217' with flexures 215, 215' in one plane. Strain gages 18, 18', 22, 22' are bonded to the top surface of bending beam 217, and strain gages 19, 19', 23, 23' are bonded to the bottom surface of bending beam 217'. When a load is placed on a platform (not shown) supported by the loading plate 204 at the mounting holes 205 near the inner edge of the loading plate 204, the bending beams 217 and 217' are forced to bend in flat S-shapes. The axially oriented strain gages 18 and 19' will accordingly sense tension strains, while the axially oriented strain gages 18' and 19 will sense compression strains. Two pairs of shear sensing strain gages 22, 22' and 23, 23' are bonded to the center of the bending beams 217, 217', and act exactly as the shear sensing strain gages 22, 22', 23, 23' described with reference to FIG. 3.

When the strain gages 18, 18', 19, 19', 22, 22', 23, 23' are incorporated in one of the bridge circuits shown in FIGS. 5, 6, or 7, the output signal from the bridge will provide a measure of the net vertical load, compensated for side-to-side and front-to-back off center load sensitivity by trimming resistors as described above with reference to FIGS. 5, 6, or 7. The planar gage bending beam load cell 200 is fully equivalent to a single point load cell 20 or 100.

By adding two pairs of shear sensing strain gages to a bending beam load cell, in accordance with embodiments of the invention, side-to-side offset load compensation can be made by simple trimming resistors, instead of by filing of the bending beams, as required in the prior art. This side-to-side offset load compensations can be combined with known electrical methods for front-to-back offset load compensation and zero adjustment. The different compensations are independent, and free from interaction. Compensation for off center load errors can accordingly be made fast and efficiently after the load cell has been hermetically sealed. This is a significant step forward in the art.

The preferred embodiments of the present invention shown and described above are free from interaction between load sensitivity and torque sensitivity. It will be apparent to those skilled in the art that strain gage bridges with different interconnections of axial strain gages and shear sensing strain gages can be used for compensation of off center load sensitivity if a larger number of terminal points, or some interaction between different adjustments can be accepted. Changes may be made in the embodiments described without departing from the principle and spirit of the invention, the scope of which is defined in the appended claims and their equivalents.

What is claimed is:

1. A bending beam load cell, comprising:
   axially oriented strain gages sensing tension and compression strains connected in a main bridge circuit having two power input terminals and two signal output terminals providing an output signal proportional to a load on the load cell;
   a shear sensing strain gage sensing torque on said load cell; and
   means for connecting said torque sensing strain gage in series with one of said axially oriented strain gages to compensate for torque sensitivity in said output signal.

2. A bending beam load cell according to claim 1, wherein a trimming resistor is shunting said one shear sensing strain gage.

3. A bending beam load cell according to claim 1, wherein at least two adjacent bridge arms contain one axially oriented strain gage and one shear sensing strain gage arranged so that the shear sensing strain gages form a half bridge at one bridge diagonal, and a first trimming resistor is connected across said half bridge.

4. A bending beam load cell according to claim 3, further comprising a pair of second trimming resistors connected between said power input terminals and one of said output terminals for compensation of front-to-back off center load error.

5. A bending beam load cell according to claim 4, wherein all of said load cell is hermetically sealed, and said first and second trimming resistors are connected to the strain gage bridge circuit via terminals in said hermetic seal.

6. A strain gage load cell, comprising:
   two parallel bending beams arranged to be cantilevered from a base and to have a vertical load act on the free ends of said cantilevered bending beams;
   axially oriented strain gages bonded to said bending beams to sense tension and compression strains near the ends of said bending beams and arranged in a main strain gage bridge having a pair of power supply terminals end a pair of signal terminals providing an output signal proportional to load;
   strain gages bonded to said bending beams at 45° angles to the axis of each bending beam to sense strains caused by torque on said load cell; and
   means for combining signals from said torque sensing strain gages with said output signal to compensate for torque sensitivity in said output signal.

7. A strain gage load cell according to claim 6, wherein said strain gages oriented at 45° are connected in a separate bridge circuit having an output signal dependent on a side-to-side off center load on said load cell, and means for combining the output signal from said separate bridge with the output signal from said main strain gage bridge.

8. A strain gage load cell according to claim 6, wherein at least one bridge arm in said main strain gage bridge contains one axially oriented strain gage and one strain gage oriented at 45°, and a trimming resistor is shunting bald one strain gage oriented at 45°.

9. A strain gage load cell according to claim 6, wherein at least two adjacent bridge arms in said main strain gage bridge contain one axially oriented strain gage and one strain gage oriented at 45° arranged so that the strain gages oriented at 45° form a half bridge at one bridge diagonal, and a first trimming resistor is connected across said half bridge.

10. A strain gage load cell according to claim 9, further comprising a pair of second trimming resistors connected between said power supply terminals and one of said signal terminals for compensation of front-to-back off center load error.

11. A strain gage loud cell according to claim 10, wherein all of said load cell is hermetically sealed, and said first and second trimming resistors are connected to the strain gage bridge circuit via terminals in said hermetic seal.

12. A bending beam load cell according to claim 6, wherein at least two bridge arms adjacent to a power supply terminal in said main strain gage bridge contain one axially oriented strain gage and one strain gage oriented at 45° arranged so that the strain gages oriented at 45° form a half bridge centered at said power supply terminal, and a first trimming resistor connected across said half bridge.

13. A bending beam load cell according to claim 12, wherein all four strain gages in said two bridge aims are contained in one composite strain gage element.

14. A bending beam load call according to claim 12, further comprising a pair of second trimming resistors connected between said power supply terminals and one of said signal terminals for compensation of front-to-back off center load error.

15. A bending beam load cell according to claim 14, wherein all of said load cell is hermetically sealed, and said first and said second trimming resistor are connected to the strain gage bridge circuit via terminals in said hermetic seal.

* * * * *

UNITED STATES PATENT AND TRADEMARK OFFICE
CERTIFICATE OF CORRECTION

PATENT NO. : 6,910,392 B2  Page 1 of 1
APPLICATION NO. : 10/368347
DATED : June 28, 2005
INVENTOR(S) : Harry E. Lockery et al.

It is certified that error appears in the above-identified patent and that said Letters Patent is hereby corrected as shown below:

Column 8,   line 58, (claim 6, line 9) change "end" to --and--.

Column 9,   line 8, (claim 8, line 4) change "bald" to --said--;
            line 21, (claim 11, line 1) change "loud" to --load--.

Column 10,  line 11, (claim 13, line 2) change "aims" to --arms--;
            line 13, (claim 14, line 1) change "call" to --cell--.

Signed and Sealed this

Seventeenth Day of April, 2007

JON W. DUDAS
*Director of the United States Patent and Trademark Office*